United States Patent
Gheorghiu et al.

(10) Patent No.: US 8,774,230 B2
(45) Date of Patent: Jul. 8, 2014

(54) CONVEYING SYNCHRONIZATION STRATUM INFORMATION

(75) Inventors: Valentin A. Gheorghiu, Tokyo (JP); Ravi Palanki, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 931 days.

(21) Appl. No.: 12/755,284

(22) Filed: Apr. 6, 2010

(65) Prior Publication Data

US 2010/0260168 A1 Oct. 14, 2010

Related U.S. Application Data

(60) Provisional application No. 61/167,652, filed on Apr. 8, 2009.

(51) Int. Cl.
*H04J 3/06* (2006.01)
(52) U.S. Cl.
USPC ............ 370/509; 370/350; 370/503; 370/512
(58) Field of Classification Search
USPC ......... 370/310, 324, 328, 345, 350, 464, 498, 370/509, 510, 512
See application file for complete search history.

(56) References Cited

U.S. PATENT DOCUMENTS

| | | | |
|---|---|---|---|
| 4,718,109 A | 1/1988 | Breeden et al. | |
| 5,363,375 A | 11/1994 | Chuang et al. | |
| 5,579,370 A | 11/1996 | Fukushima et al. | |
| 6,542,754 B1 * | 4/2003 | Sayers et al. | 455/502 |
| 6,622,022 B1 | 9/2003 | Du | |
| 6,665,541 B1 | 12/2003 | Krasner et al. | |

(Continued)

FOREIGN PATENT DOCUMENTS

| | | | |
|---|---|---|---|
| EP | 0592209 A1 | 4/1994 | |
| JP | H07312773 A | 11/1995 | |

(Continued)

OTHER PUBLICATIONS

Justin C I Chuang Ed—Institute of Electrical and Electronics Engineers: Autonomous Time Synchronization Among Radio Ports in Wireless Personal Communications Personal Communication—Freedom Through Wireless Technology. Secaucus, NJ., May 18-20, 1993; [Proceedings of the Vehicular Technology Conference], New York, IEEE, US, vol. Conf. 43, May 18, 1993, pp. 700-705, XP000393279 ISBN: 978-0-7803-1267-8 * abstract p. 701, left-hand column, lines 4-10 p. 702, right-hand column, lines 22-55.

(Continued)

*Primary Examiner* — Chi Pham
*Assistant Examiner* — Weibin Huang
(74) *Attorney, Agent, or Firm* — Ashish L. Patel

(57) ABSTRACT

A method for self synchronization of a first base station is described. Synchronization information is received from a second base station. The first base station then synchronizes with the second base station using the received synchronization information. Synchronization information may be received from one or more base stations. The second base station may be part of the one or more base stations. A stratum may be determined for each of the one or more base stations. The synchronization information may include a stratum. The second base station may be selected as a synchronizing base station. The second base station may have the lowest stratum.

33 Claims, 11 Drawing Sheets

(56) References Cited

U.S. PATENT DOCUMENTS

| | | | |
|---|---|---|---|
| 8,102,754 | B2* | 1/2012 | Baldemair et al. ............ 370/203 |
| 2002/0054611 | A1 | 5/2002 | Seta |
| 2005/0281247 | A1 | 12/2005 | Lim et al. |
| 2006/0245440 | A1 | 11/2006 | Mizukoshi |
| 2006/0251017 | A1* | 11/2006 | Bishop .......................... 370/330 |
| 2008/0240073 | A1* | 10/2008 | Pun et al. ...................... 370/350 |
| 2009/0117896 | A1* | 5/2009 | Baldemair et al. ............ 455/434 |
| 2009/0117905 | A1* | 5/2009 | Watanabe et al. ............. 455/437 |
| 2009/0323565 | A1 | 12/2009 | Funakubo et al. |
| 2010/0067496 | A1* | 3/2010 | Choi .............................. 370/336 |
| 2010/0263012 | A1* | 10/2010 | Huang et al. .................. 725/116 |
| 2011/0243107 | A1* | 10/2011 | Koivisto et al. ............... 370/336 |

FOREIGN PATENT DOCUMENTS

| | | | |
|---|---|---|---|
| JP | 2006311172 A | | 11/2006 |
| JP | 2008219526 A | | 9/2008 |
| JP | 2008228177 A | | 9/2008 |
| JP | 2008283673 A | | 11/2008 |
| JP | 2009071377 A | | 4/2009 |
| RU | 2218667 C2 | | 12/2003 |
| WO | 02098024 | | 12/2002 |
| WO | 2008050220 A1 | | 5/2008 |
| WO | WO 2008050220 A1 | * | 5/2008 |
| WO | 2008107995 A1 | | 9/2008 |
| WO | 2008133567 A1 | | 11/2008 |

OTHER PUBLICATIONS

International Search Report and Written Opinion—PCT/US2010/030436—ISA/EPO—Mar. 14, 2011.
Nokia Siemens Networks et al., "Further Consideration on LTE TDD HeNB Synchronization Use Case and Extra Signaling", 3GPP Draft, R4-100050, 3rd Generation Partnership Project (3GPP), Mobile Competence Centre, 650, Route Des Lucioles, F-06921 Sophia-Antipolis Cedex, France, vol. RAN WG4, No. Sophia, 20100118, Jan. 12, 2010, XP050427771.
Nokia Siemens Networks et al., "Inter eNB over-the-air communication (OTAC) for LTE-Advanced", 3GPP Draft, R1-091373_OTAC, 3rd Generation Partnership, Project (3|GPP), Mobile Competence Centre, 650, Route Des Lucioles, F-06921 Sophia-Antipolis Cedex, France, No. Seoul, Korea, 20090318, Mar. 18, 2009, XP050338963.
QUALCOMM Europe, Self-synchronization 3GPP Draft, R3-090700, 3rd Generation Partnership Project (3GPP), Mobile Competence Centre, 650, Route Des Lucioles, F-06921 Sophia-Antioplis Cedex, France, No. Seoul, Korea, 2009,0321, Mar. 21, 2009, XP050341087.
TSG-RAN WG4, "Support for time and frequency synchronization using network listening", 3GPP Draft, R2-095423_R4-093465, 3rd Generation Partnership Project (3GPP), Mobile Competence Centre, 650, Route Des Lucioles, F-06921 Sophia-Antipolis Cedex, France, vol. RAN WG2, No. Valencia, Spain, 20100118, Jan. 2, 2010, XP050420672.
Chuang J.C.I, "Autonomous Time Synchronization among Radio Ports in Wireless Personal Communications", IEEE Transactions on vehicular Technology vol. 43, No. 1, Feb. 1994, pp. 27-32.
Guang Han, Stavros Tzavidas, Hua Xu; Motorola: Yang Xiangying; Intel: "Time synchronization for Femtocells"[Online] Nov. 12, 2008, pp. 1-3, XP002585802 IEEE 802.16 Broadband Wireless Access Working Group Retrieved from the Internet: URL: http://www.ieee802.org/16/tgm/contrib/C80216m-08_1368rl.doc.
Orange, Sprint Nextel, Telefonica, Vodafone Group: "Frequency synchronization requirement at eNB input for LTE", R4-070649, 3GPP TSG-RAN WG4 #43, May 11, 2007.
QUALCOMM Europe: "Support for Self-Synchronization in LTE Release 8", R3-082457, 3GPP TSG-RAN WG3 #61bis, Oct. 3, 2008.
QUALCOMM Europe: "Synchronization Requirements and Techniques", 3GPP Draft, R4-091336, 3rd Generation Partnership Project (3GPP), Mobile Competence Centre, 650, Route Des Lucioles, F-06921 Sophia-Antipolis Cedex, France, No. Seoul, Korea, 20090319, Mar. 19, 2009, XP050342103, [retrieved on Mar. 19, 2009].
Taiwan Search Report—TW099110942—TIPO—Mar. 3, 2013.
Yang, X., et al.,"IEEE 802.16m support for femto-cell", IEEE C802.16m-08/1348, IEEE 802.16 Task Group m (TGm), Oct. 31, 2008.
European Search Report—EP121765572—Search Authority—Hague—Nov. 18, 2013.

* cited by examiner

CONVEYING SYNCHRONIZATION STRATUM INFORMATION

RELATED APPLICATIONS

This application is related to and claims priority from U.S. Provisional Patent Application Ser. No. 61/167,652, filed Apr. 8, 2009, for "Methods And Apparatus For Conveying Synchronization Stratum Information."

TECHNICAL FIELD

The present disclosure relates generally to wireless communication systems. More specifically, the present disclosure relates to systems and methods for conveying synchronization stratum information.

BACKGROUND

Wireless communication systems have become an important means by which many people worldwide have come to communicate. A wireless communication system may provide communication for a number of mobile stations, each of which may be serviced by a base station.

Each of the base stations in a wireless communication system may operate synchronously. In other words, each of the base stations may synchronize clocks with the same source. By operating synchronously, improvements such as interference management may be achieved.

In addition to the wireless communication systems currently in place, a new class of small base stations has emerged. These small base stations may be installed in a user's home and provide indoor wireless coverage to mobile stations using existing broadband Internet connections. Typically, these miniature base stations are connected to the Internet and the mobile device's network via a Digital Subscriber Line (DSL) router or cable modem. Benefits may be realized by improved methods for synchronizing these miniature base stations.

DETAILED DESCRIPTION

Figure 1:
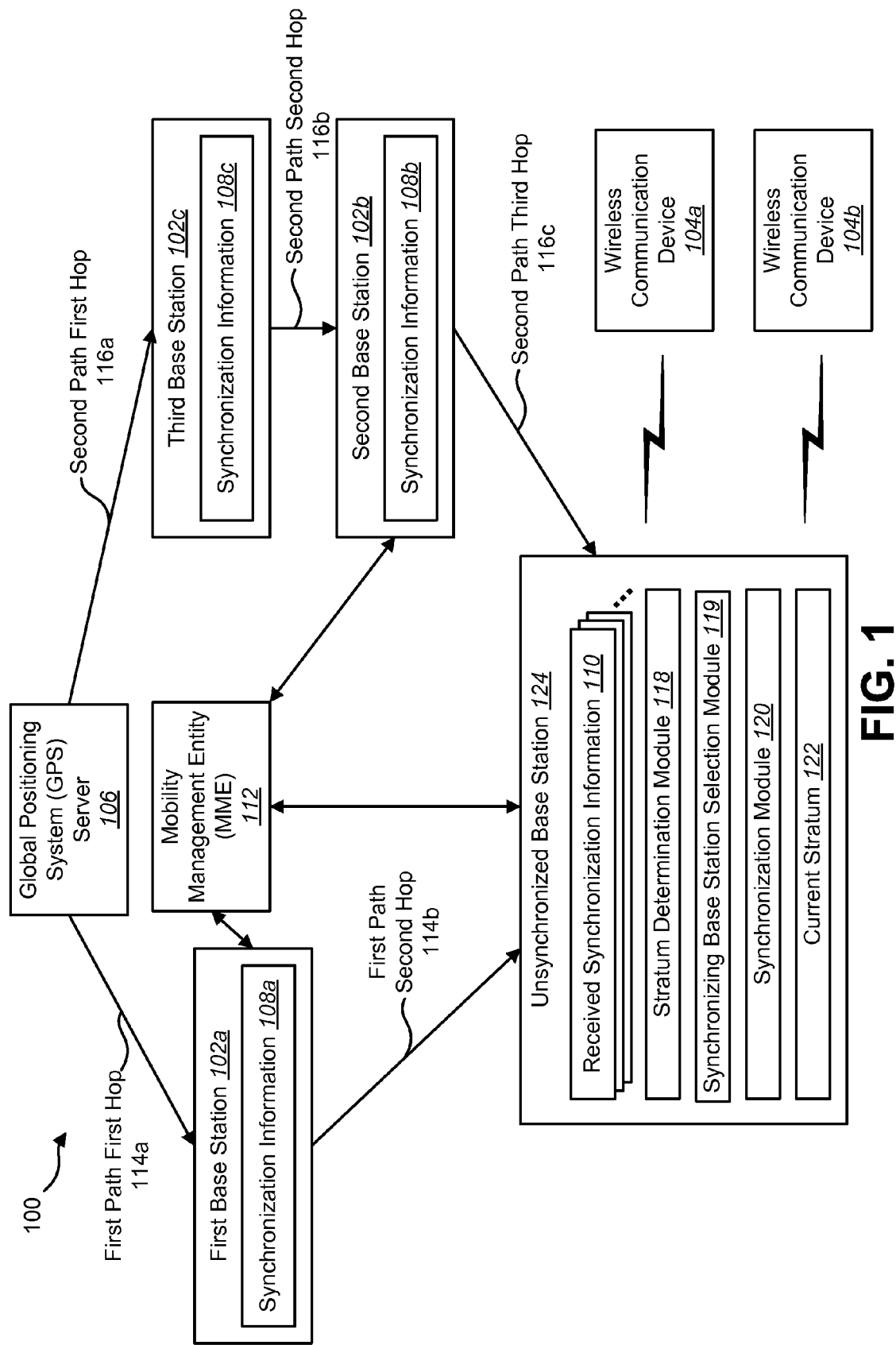
FIG. 1 shows a wireless communication system 100 with multiple wireless devices.

A method for self synchronization of a first base station is described. Synchronization information is received from a second base station. Synchronizing with the second base station is performed using the received synchronization information.

The synchronization information may include synchronization stratum information and/or synchronization status information. Synchronization information may be received from one or more base stations. The second base station may be part of the one or more base stations. A stratum may be determined for each of the one or more base stations. Synchronization information may include a stratum. The second base station may be selected as a synchronizing base station. The second base station may have the lowest stratum.

Determining a stratum for each of the one or more base stations may include determining a number of intermediate synchronous nodes between each of the one or more base stations and a global positioning system (GPS) server. A current stratum may be determined for the first base station based on the stratum of the second base station. Transmissions may be ceased during a coordinated silence period. The coordinated silence period may be coordinated using the synchronization information. The coordinated silence period may refer to slots designated for base stations having a stratum less than the current stratum to transmit synchronization information.

The coordinated silence period may be observed to improve a signal to interference noise ratio (SINR) for synchronization. The current stratum may be transmitted during a coordinated silence period. The coordinated silence period may refer to slots designed for base stations having a stratum less than or equal to the current stratum to transmit synchronization signals. The synchronization information may be received from one or more base stations wirelessly. The synchronization information may be in a system information message. The synchronization information may be conveyed through a master information block (MIB) or a system information block (SIB). The second base station stratum may be conveyed in reserved bits of the MIB.

The synchronization information may be signaled on a physical downlink control channel (PDCCH) used in Long Term Evolution (LTE). The synchronization information may also be signaled on a physical downlink shared channel (PDSCH) used in Long Term Evolution (LTE). The synchronization information may be stored in a Mobility Management Entity (MME). The synchronization information may be received from one or more base stations via a backhaul. The synchronization information may be signaled over an S1 interface or over an X2 interface. The synchronization information may be stored in a home evolved NodeB (HeNB) Management Server (HMS).

Synchronizing with the second base station using the received synchronization information may include adjusting a timing of the base station to match a timing of the synchronizing base station. The synchronization information of the synchronization base station may be periodically monitored. The first base station may be a macro base station or a home evolved NodeB (HeNB). The synchronization base station may be a macro base station or a home evolved NodeB (HeNB). The synchronization information may be tied to a Primary Synchronization Signal (PSS) or to a Secondary Synchronization Signal (SSS).

A method for conveying synchronization information is also described. A current stratum is determined. A first coordinated silence period and a second coordinated silence period are determined based on the current stratum. Synchronization information is transmitted during the first coordinated silence period.

A wireless device configured for self synchronization is described. The wireless device includes a processor, memory in electronic communication with the processor and instructions stored in the memory. The instructions are executable by the processor to receive synchronization information from a second base station and synchronize with the second base station using the received synchronization information.

A wireless device configured for conveying synchronization information is also described. The wireless device includes a processor, memory in electronic communication with the processor and instructions stored in the memory. The instructions are executable by the processor to determine a current stratum. The instructions are also executable by the processor to determine a first coordinated silence period and a second coordinated silence period based on the current stratum. The instructions are further executable by the processor to transmit synchronization information during the first coordinated silence period.

A wireless device configured for self synchronization is described. The wireless device includes means for receiving synchronization information from a base station and means for synchronizing with the base station using the received synchronization information.

A computer-program product for self synchronization of a first base station is also described. The computer-program product includes a computer-readable medium having instructions thereon. The instructions include code for receiving synchronization information from a second base station and code for synchronizing with the second base station using the received synchronization information.

A wireless device configured for conveying synchronization information is described. The wireless device includes means for determining a current stratum. The wireless device also includes means for determining a first coordinated silence period and a second coordinated silence period based on the current stratum. The wireless device further includes means for transmitting synchronization information during the first coordinated silence period.

A computer-program product for self synchronization of a first base station is also described. The computer-program product includes a computer-readable medium having instructions thereon. The instructions include code for determining a current stratum. The instructions also include code for determining a first coordinated silence period and a second coordinated silence period based on the current stratum. The instructions further include code for transmitting synchronization information during the first coordinated silence period.

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems, and mobile devices.

In 3GPP LTE, a mobile station or device may be referred to as a "user equipment" (UE). A base station may be referred to as an evolved NodeB (eNB). A semi-autonomous base station may be referred to as a home eNB (HeNB). An HeNB may thus be one example of an eNB. The HeNB and/or the coverage area of an HeNB may be referred to as a femtocell, a picocell, an HeNB cell or a closed subscriber group (CSG) cell.

FIG. 1 shows a wireless communication system 100 with multiple wireless devices. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device may be a base station 102, an unsynchronized base station 124, a wireless communication device 104, a global positioning system (GPS) server 106 or a mobility management entity (MME) 112.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "Base Station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

Communications in a wireless system (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, forward and reverse link transmissions are on the same frequency region so that the reciprocity principle allows the estimation of the forward link channel from the reverse link channel. This enables a transmitting wireless device to extract transmit beamforming gain from communications received by the transmitting wireless device.

The wireless communication system 100 may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, Third Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) systems utilize single carrier modulation and frequency domain equalization. An SC-FDMA system has similar performance and essentially the same overall complexity as those of an OFDMA system. An SC-FDMA signal has lower peak-to-average power ratio (PAPR) because of its inherent single carrier structure. SC-FDMA has drawn great attention, especially in uplink communications where lower peak to average power ratio (PAPR) greatly benefits the mobile terminal in terms of transmit power efficiency. It is currently a working assumption for uplink multiple access scheme in 3GPP Long Term Evolution (LTE), or Evolved UTRA.

Synchronization among base stations 102 in a wireless network brings many benefits such as interference management or virtual MIMO. Traditionally, cellular network synchronization is achieved using GPS receivers collocated with base stations 102. GPS receivers and/or GPS signals may not always be available for synchronization purposes due to manufacturing cost consideration, power consumption limitations, the lack of line-of-sight to GPS satellites and other reasons. In such scenarios, alternative synchronization strategies may be necessary. One such scenario is the heterogeneous deployments used in LTE or LTE-A.

Less power base stations 102 such as home evolved NodeBs (HeNB), picocells and femtocells are used in addition to the normal base stations 102. A picocell may refer to a base station 102 controlled by the network operator that operates on a much smaller scale than normal base stations 102. A femtocell may refer to a base station 102 controlled by a consumer that operates on a much smaller scale than normal base stations 102. A femtocell may provide service to a closed subscriber group. A femtocell, picocell and HeNB may have similar transmit powers and coverage areas. A femtocell, picocell and HeNB may be placed indoors where they are unlikely to receive a GPS signal. Alternatively, a femtocell, picocell or HeNB may not even have a GPS receiver. A normal base station 102 may be referred to as a macro base station 102. A base station 102 without current synchronization may be referred to as an unsynchronized base station 124. An unsynchronized base station 124 may thus be an HeNB, a picocell, or a femtocell.

An unsynchronized base station 124 may derive synchronization from an already synchronized base station 102. For example, the unsynchronized base station 124 may derive synchronization from the first base station 102a or the second base station 102b. In order for the unsynchronized base station 124 to derive its own stratum and acquire synchronization to minimize stratum, a method to convey the stratum information between the base stations 102, 124 is necessary.

Both the first base station 102a and the second base station 102b may be synchronized to the global positioning system (GPS) server 106. The first base station 102a may be synchronized directly with the global positioning system (GPS) server 106 via a first path first hop 114a. The second base station 102b may be synchronized indirectly with the global position system (GPS) server 106 via a third base station 102c. The third base station 102c may synchronize with the global positioning system (GPS) server 106 via a second path first hop 116a and then provide synchronization to the second base station 102b via a second path second hop 116b.

The unsynchronized base station 124 may derive synchronization from the first base station 102a via a first path second hop 114b or from the second base station 102b via a second path third hop 116c. Because the first base station 102a, the second base station 102b and the third base station 102c are each synchronized with the global positioning system (GPS) server 106, each may include synchronization information 108a-c. Synchronization information is discussed in additional detail below in relation to FIG. 3.

The synchronized base stations 102 of FIG. 1 may be macro base stations, HeNBs, picocells or femtocells. The unsynchronized base station 124 may receive synchronization information 108 from a base station 102 via wired or wireless means. In one configuration, the unsynchronized base station 124 may receive synchronization information 108 from a base station 102 through a mobility management entity (MME) 112. Sending information through a mobility management entity (MME) 112 may be referred to as using the backhaul. Base stations 102 use the backhaul to exchange different kinds of information. Receiving synchronization information 108 from a base station 102 directly via wireless means or indirectly via the mobility management entity (MME) 112 may be referred to as one hop.

The unsynchronized base station 124 may include multiple received synchronization information 110 from different sources. For example, the unsynchronized base station 124 may receive the synchronization information 108a from the first base station 102a and the synchronization information 108b from the second base station 102b. The unsynchronized base station 124 may also include a stratum determination module 118. The stratum determination module 118 may determine the stratum of each base station 102 from which the unsynchronized base station 124 has received synchronization information 110. Stratum refers to the number of intermediate synchronous nodes between a base station 102 and the global positioning system (GPS) server 106. The stratum of each base station 102 may be explicitly included in synchronization information 108. Alternatively, the stratum of each base station 102 may need to be derived based on the synchronization information 108.

The unsynchronized base station 124 may include a synchronizing base station selection module 119. The unsynchronized base station 124 may receive synchronization information 110 from multiple base stations 102. The synchronizing base station selection module 119 may select a base station 102 as the synchronizing base station 102 based on the stratum of each base station 102. The base station 102 with the lowest stratum should be selected as the synchronizing base station 102. The unsynchronized base station 124 may then use a synchronization module 120 to obtain synchronization from the synchronizing base station 102. In one configuration, the synchronization module 120 may derive synchronization from the received synchronization information 110 of the synchronizing base station 102.

The unsynchronized base station 124 may include a current stratum 122. The current stratum 122 may refer to the number of intermediate synchronous nodes between the unsynchronized base station 124 and the global positioning system (GPS) server 106. The current stratum 122 depends on the stratum of the synchronizing base station 102. The current stratum 122 will be one greater than the synchronizing base station 102.

As discussed above, the unsynchronized base station 124 may communicate with one or more wireless communication devices 104a-b. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc. A wireless communication device 104 may communicate with zero, one, or multiple base stations 124 on the downlink and/or uplink at any given moment. The downlink (or forward link) refers to the communication link from a base station 124 to a wireless communication device 104, and the uplink (or reverse link) refers to the communication link from a wireless communication device 104 to a base station 124.

Figure 2:
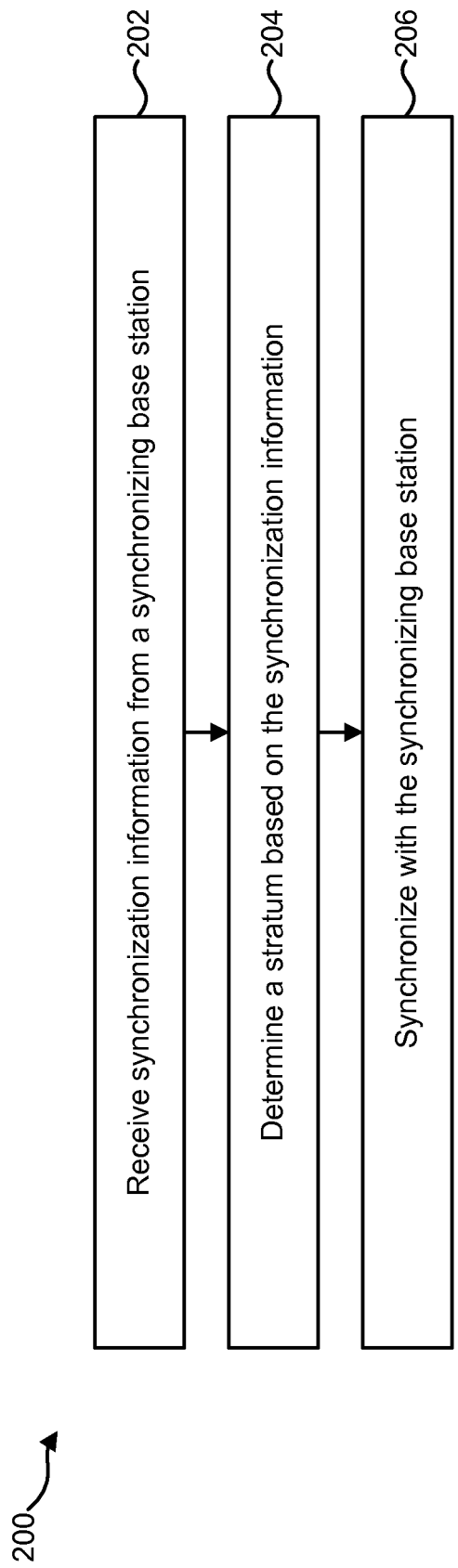
FIG. 2 is a flow diagram of a method for self synchronization of a base station.

FIG. 2 is a flow diagram of a method 200 for self synchronization of a base station 102. The method 200 may be performed by a base station 102 such as an unsynchronized base station 124. Synchronized base stations 102 may also perform the method 200. In one configuration, the unsynchronized base station 124 may be an HeNB. The unsynchronized base station 124 may receive 202 synchronization information 110 from a synchronizing base station 102. The unsynchronized base station 124 may determine 204 a stratum based on the synchronization information 110. The stratum may be the stratum of the synchronizing base station 102. The unsynchronized base station 124 may then synchronize 206 with the synchronizing base station 102. Synchronizing may include adjusting one or more clocks on the unsynchronized base station 124 to align with one or more clocks on the synchronizing base station 102. The wireless network may support synchronous operation. In synchronous operation, each of the base stations 102 may have similar frame timing and transmissions from different base stations 102 may be approximately aligned in time.

Figure 3:
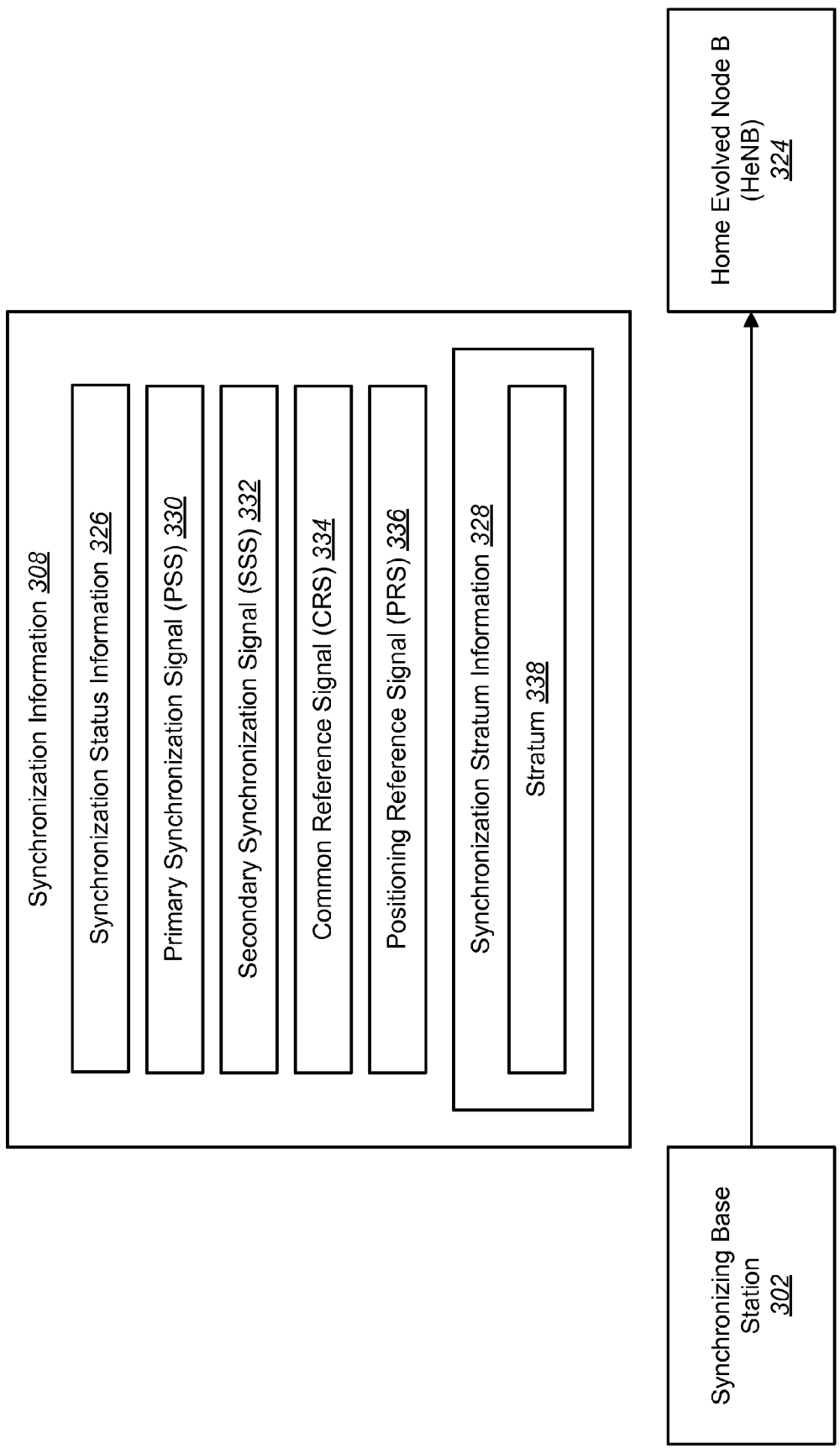
FIG. 3 is a block diagram illustrating the transmission of synchronization information from a synchronizing base station to a home evolved NodeB (HeNB)

FIG. 3 is a block diagram illustrating the transmission of synchronization information 308 from a synchronizing base station 302 to a home evolved NodeB (HeNB) 324. The home evolved NodeB (HeNB) 324 of FIG. 3 may be one configuration of the unsynchronized base station 124 of FIG. 1. The synchronizing base station 302 of FIG. 3 may be one configuration of the first base station 102a of FIG. 1. The synchronizing base station 302 may be a macro base station or an HeNB. The synchronization information 308 may be transmitted during a coordinated silence period depending on the stratum of the synchronizing base station 302. A coordinated silence period may be controlled by a network. For example, a core network or a radio network controller (RNC) may coordinate the coordinated silence period. There may be more than one coordinated silence period. Coordinated silence periods are discussed in additional detail below in relation to FIG. 7.

The synchronization information 308 may include synchronization status information 326. The synchronization status information 326 is a bit that says whether the synchronizing base station 302 is synchronized directly or indirectly (through multiple hops) to a global positioning system (GPS) server 106. The synchronization status information 326 may be used by the home evolved NodeB (HeNB) 324 acquiring synchronization to ensure that the source (i.e., the synchronizing base station 302) is a valid source.

The synchronization information 308 may also include a Primary Synchronization Signal (PSS) 330 used to synchronize during cell search. The synchronization information 308 may further include a Secondary Synchronization Signal (SSS) 332 used to synchronize timing and to transmit cell group identification during cell search. The synchronization information 308 may also include a common reference signal (CRS) 334 and a positioning reference signal (PRS) 336. The Primary Synchronization Signal (PSS) 330, Secondary Synchronization Signal (SSS) 332, common reference signal (CRS) 334 and positioning reference signal (PRS) 336 may be tied to the cell ID.

The synchronization information 308 may also include synchronization stratum information 328. The synchronization stratum information 328 may include the stratum 338 of the synchronizing base station 302. As discussed above, the stratum 338 refers to the number of hops from a base station directly synchronizing with the global positioning system (GPS) server 106. The base station directly synchronizing with the global positioning system (GPS) server 106 is said to have stratum-0. A node that is acquiring synchronization (such as a home evolved NodeB (HeNB) 324) is required to use a source with the lowest stratum 338. Because synchronization could be acquired from different sources, selecting the source with the lowest stratum 338 minimizes the number of hops that exist in the network. The synchronization stratum information 328 may only include the stratum 338 of the base station 302 that sends it. The synchronization stratum information 328 and the synchronizing status information 326 are implicitly tied to the Primary Synchronization Signal (PSS) 330, Secondary Synchronization Signal (SSS) 332, common reference signal (CRS) 334 and positioning reference signal (PRS) 336 through the cell ID.

Some families of the Primary Synchronization Signal (PSS) 330 and the Secondary Synchronization Signal (SSS) 332 can be declared for each stratum 338. Because a home evolved NodeB (HeNB) 324 is likely to derive synchronization using the Primary Synchronization Signal (PSS) 330/Secondary Synchronization Signal (SSS) 332 of already synchronized cells, using the Primary Synchronization Signal (PSS) 330/Secondary Synchronization Signal (SSS) 332 allows the home evolved NodeB (HeNB) 324 to derive the stratum 338 in an efficient and timely manner.

Figure 4:
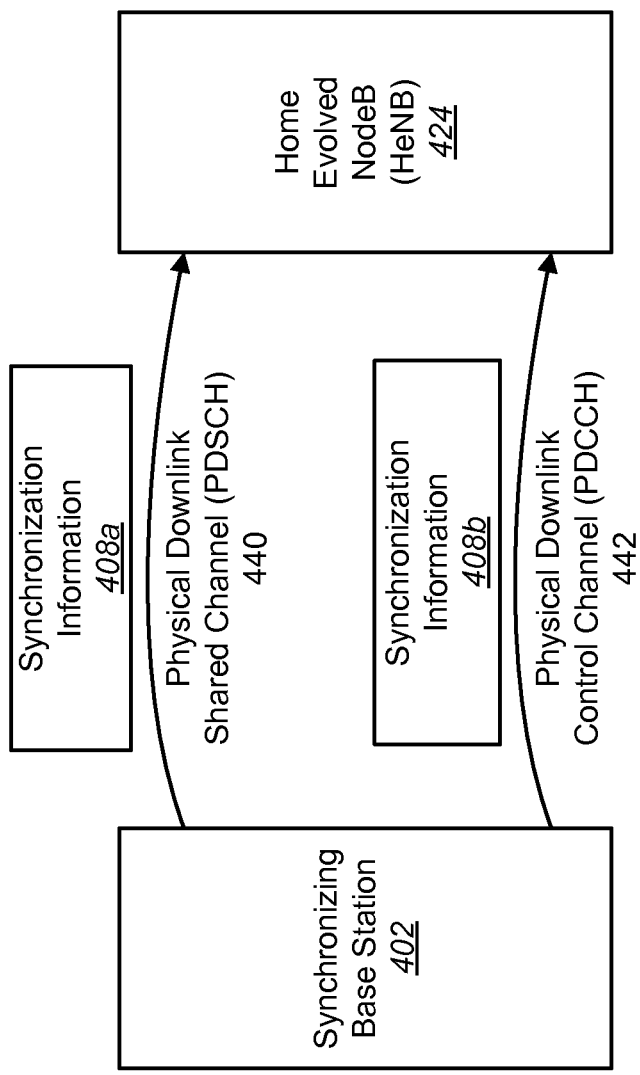
FIG. 4 illustrates the transmission of synchronization information from a synchronizing base station to a home evolved NodeB (HeNB)

FIG. 4 illustrates the transmission of synchronization information 408 from a synchronizing base station 402 to a home evolved NodeB (HeNB) 424. The synchronizing base station 402 of FIG. 4 may be one configuration of the first base station 102a of FIG. 1. The home evolved NodeB (HeNB) 424 of FIG. 4 may be one configuration of the unsynchronized base station 124 of FIG. 1. The synchronizing base station 402 may transmit synchronization information 408a to the home evolved NodeB (HeNB) 424 via the physical downlink shared channel (PDSCH) 440. The physical downlink shared channel (PDSCH) 440 may be used to send common user data and control information to wireless communication devices 104 or other base stations 102. The synchronizing base station 402 may also transmit synchronization information 408b to the home evolved NodeB (HeNB) 424 via the physical downlink control channel (PDCCH) 442. The physical downlink control channel (PDCCH) 442 is a transmission channel that is used to transfer control information to wireless communication devices 104. However, the physical downlink control channel (PDCCH) 442 may also be used to transmit information between base stations 102.

In one configuration, the synchronizing base station 402 may exclusively use either the physical downlink shared channel (PDSCH) 440 or the physical downlink control channel (PDCCH) 442 to send synchronization information 408 to the home evolved NodeB (HeNB) 424. Alternatively, the synchronizing base station 402 may use both the physical downlink shared channel (PDSCH) 440 and the physical downlink control channel (PDCCH) 442 to send synchronization information 408. Other channels used in LTE may also be used to send the synchronization information 408.

Figure 5:
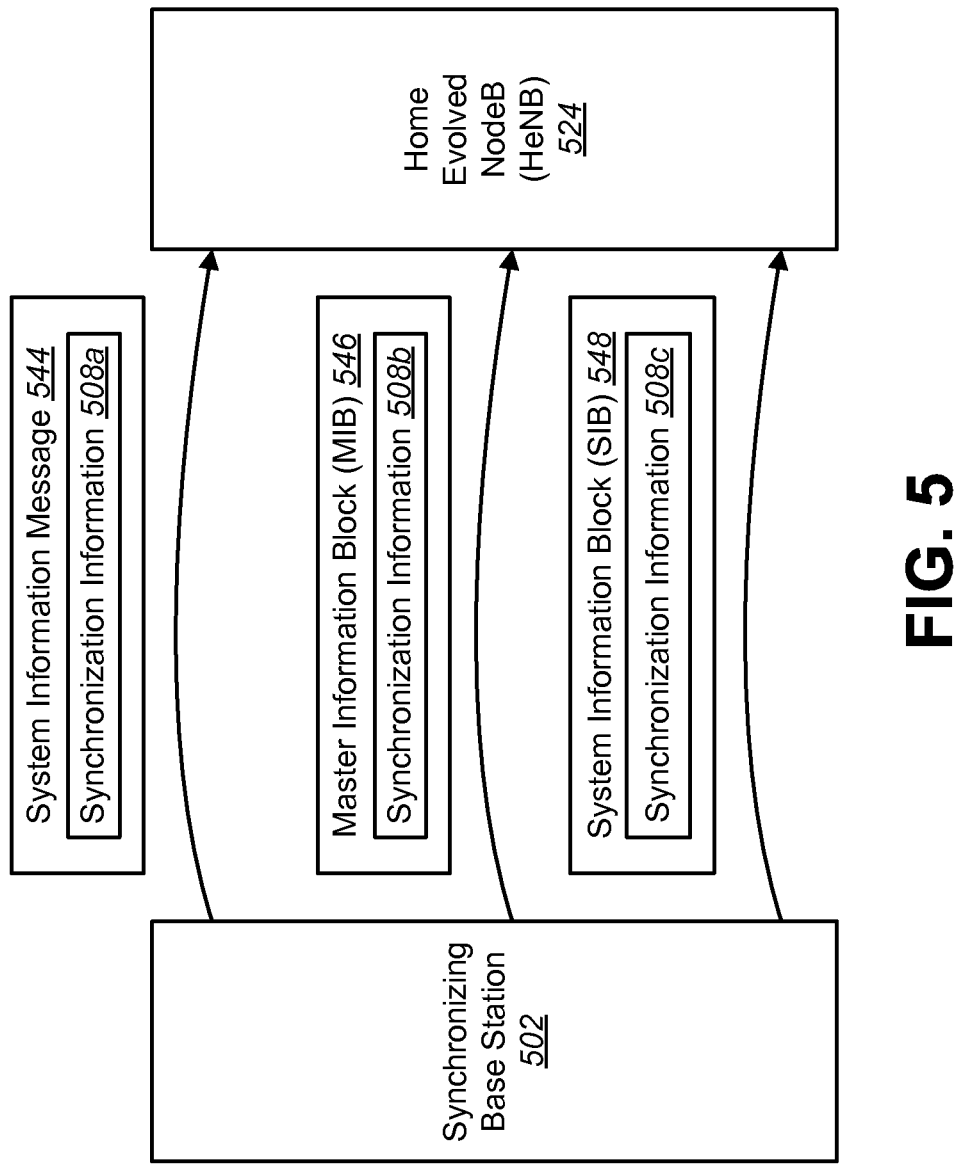
FIG. 5 also illustrates the transmission of synchronization information from a synchronizing base station to a home evolved NodeB (HeNB)

FIG. 5 also illustrates the transmission of synchronization information 508 from a synchronizing base station 502 to a home evolved NodeB (HeNB) 524. The synchronizing base station 502 of FIG. 5 may be one configuration of the first base station 102a of FIG. 1. The home evolved NodeB (HeNB) 524 of FIG. 5 may be one configuration of the unsynchronized base station 124 of FIG. 1. The synchronizing base station 502 may transmit synchronization information 508a to the home evolved NodeB (HeNB) 524 via a system information message 544. A system information message 544 may include a master information block (MIB) 546 or a system information block (SIB) 548.

The synchronizing base station 502 may also transmit synchronization information 508b to the home evolved NodeB (HeNB) 524 in a master information block (MIB) 546. The master information block (MIB) 546 is a set of information about the physical configuration of the Universal Mobile Telecommunications Service (UMTS) LTE system. The master information block (MIB) 546 may carry the downlink system bandwidth, the number of transmission antennas, physical paging channel configuration and the system frame number. Reserved bits, such as the bits reserved in the master information block (MIB) 546 (sent on the physical broadcast channel (PBCH)), could be used to transmit the synchronization information 508b and/or the stratum level.

The synchronizing base station 502 may also transmit synchronization information 508c to the home evolved NodeB (HeNB) 524 in a system information block (SIB) 548. A system information block (SIB) 548 is a set of information that describes a system configuration and the specific parameters that should be used when attempting to access the system. In one configuration, the synchronizing base station 502 may transmit the synchronization information 508c to the home evolved NodeB (HeNB) 524 in a new system information block (SIB) 548. A new system information block (SIB) 548 is a new system information message that includes synchronization information 508c that could be defined for LTE.

Figure 6:
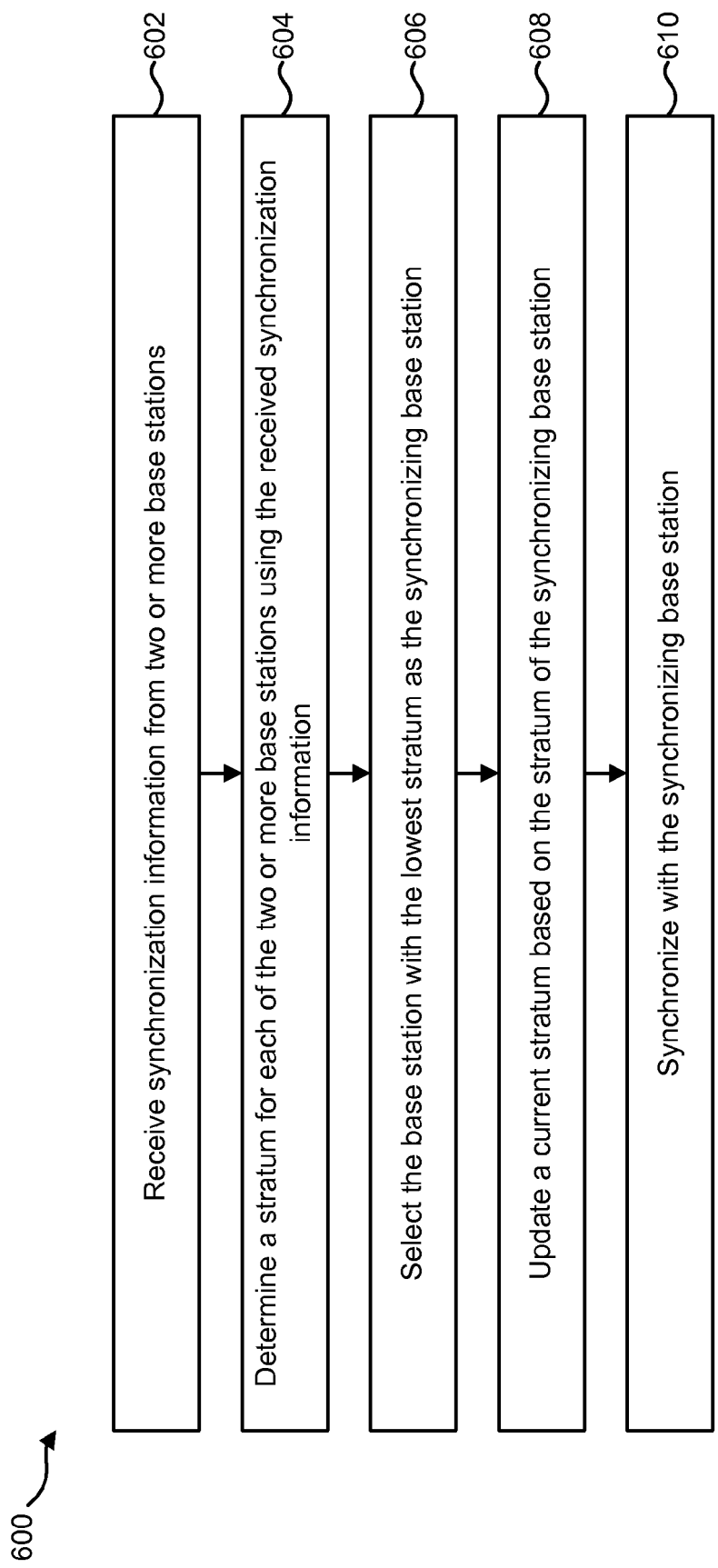
FIG. 6 is a flow diagram of another method for self synchronization of a base station.

FIG. 6 is a flow diagram of another method 600 for self synchronization of a base station. The method 600 may be performed by a base station such as an unsynchronized base station 124. Synchronized base stations 102 may also perform the method 600. In one configuration, the unsynchronized base station 124 may be a home evolved NodeB (HeNB) 324. The unsynchronized base station 124 may receive 602 synchronization information 110 from two or more base stations 102. The unsynchronized base station 124 may determine 604 a stratum 338 for each of the two or more base stations 102 using the received synchronization information 110. In one configuration, the unsynchronized base station 124 may determine 604 the stratum 338 based on the stratum 338 indicated in the synchronization stratum information 328.

The unsynchronized base station 124 may then select 606 the base station with the lowest stratum 338 as the synchronizing base station 302. If multiple base stations have the same stratum 338, the unsynchronized base station 124 may select the base station 102 with the highest SNR (i.e., the best signal quality) as the synchronizing base station 302. A base station 102 with the lowest stratum 338 is the base station 102 with the least number of hops to a base station 102 directly synchronizing with the global positioning system (GPS) server 106. The unsynchronized base station 124 may update 608 a current stratum 122 based on the stratum 338 of the synchronizing base station 302. For example, the unsynchronized base station 124 may update 608 the current stratum 122 to be one greater than the stratum 338 of the synchronizing base station 302. The unsynchronized base station 124 may then synchronize 610 with the synchronizing base station 302.

Figure 7:
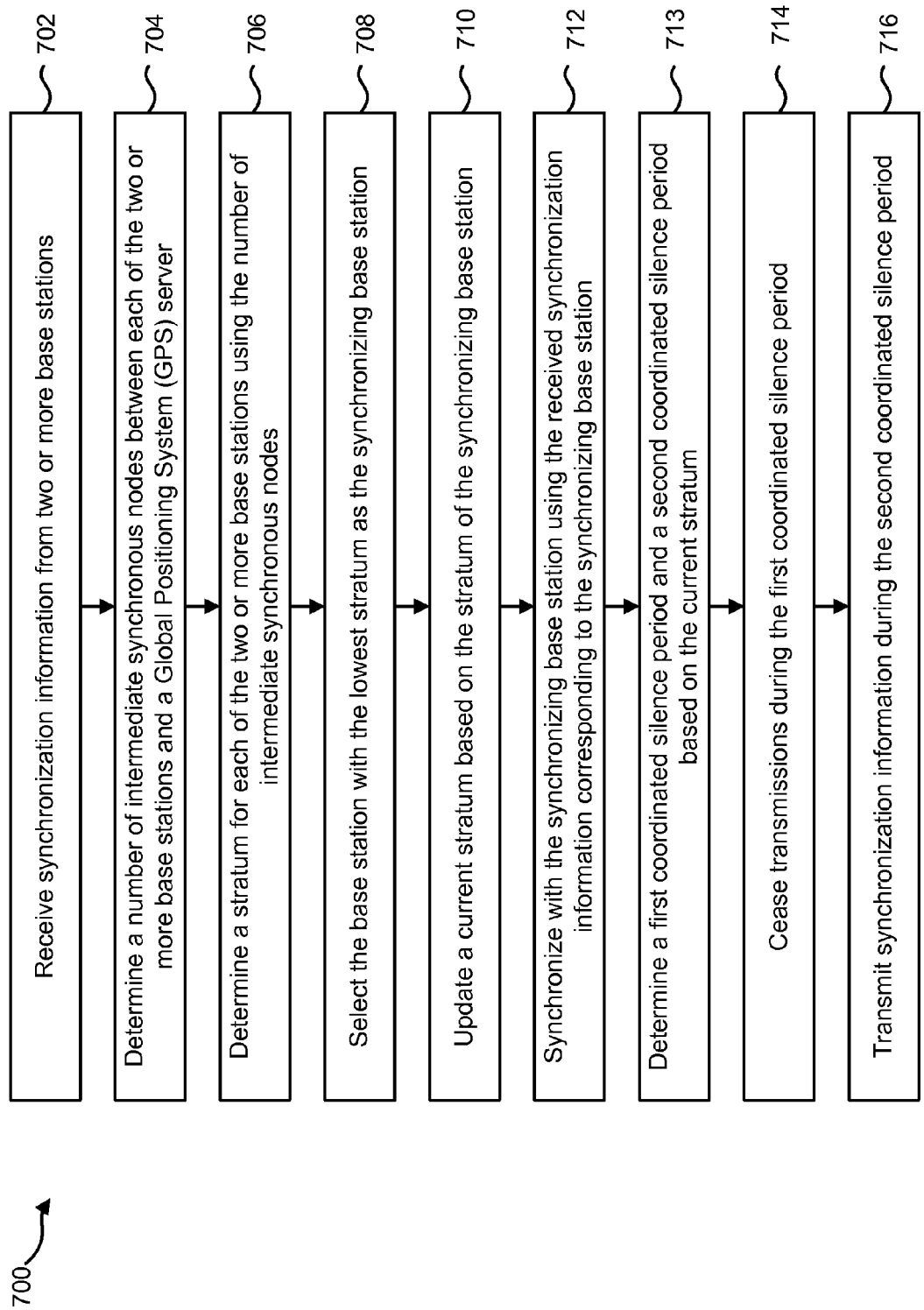
FIG. 7 is a flow diagram of yet another method of self synchronization of a base station.

FIG. 7 is a flow diagram of yet another method 700 of self synchronization of a base station. The method 700 may be performed by a base station such as an unsynchronized base station 124. Synchronized base stations 102 may also perform the method 700. In one configuration, the unsynchronized base station 124 may be a home evolved NodeB (HeNB) 324. The unsynchronized base station 124 may receive 702 synchronization information 110 from two or more base stations 102. The unsynchronized base station 124 may then determine 704 a number of intermediate synchronous nodes between each of the two or more base stations 102 and a global positioning system (GPS) server 106.

The unsynchronized base station 124 may then determine 706 a stratum 338 for each of the two or more base stations 102 using the determined number of intermediate synchronous nodes. Blind detection of the stratum 338 of a base station 102 may be achieved if the unsynchronized base station 124 does not receive the stratum 338 directly from a base station 102. The unsynchronized base station 124 may listen to all signals and determine the stratum 338 based on the timing when other base stations 102 silence their transmissions. The unsynchronized base station 124 may select 708 the base station 102 with the lowest stratum 338 as the synchronizing base station 302. Next, the unsynchronized base station 124 may update 710 a current stratum 122 based on the stratum 338 of the synchronizing base station 302. The unsynchronized base station 124 may then synchronize 712 with the synchronizing base station 302 using the received synchronization information 110 corresponding to the synchronizing base station 302.

As discussed above in relation to FIG. 3, synchronization information 308 may be transmitted during a coordinated silence period. Depending on the number of different stratum, multiple coordinated silence periods may occur. Because the base stations 102 receive synchronization from either a global positioning system (GPS) server 106 or another base station 102, interference may occur when multiple base stations 102 attempt to transmit synchronization information 108 at the same time. Although the unsynchronized base station 124 is now synchronized, for clarity, it is still referred to as the unsynchronized base station 124.

Mechanisms such as coordinated silence that are used to improve the signal to interference plus noise ratio (SINR) may also be used to help monitor the channel where the stratum 338 is transmitted. A base station 102 may determine 713 a first coordinated silence period and a second coordinated silence period based on the current stratum 122. A base station 102, 124 may cease 714 transmissions during the first coordinated silence period. The first coordinated silence period may refer to slots designated for base stations 102 having a stratum less than the current stratum 122 to transmit synchronization information 308.

For example, if the current stratum 122 of the unsynchronized base station 124 is three (stratum-3) and the first coordinated silence period is designated for the transmission of synchronization information 308 by base stations 102 with a stratum of two (stratum-2) or lower, the unsynchronized base station 124 may cease 714 transmissions during the first coordinated silence period. Only base stations 102 with a stratum of two or lower (i.e., stratum-2, stratum-1 and stratum-0) may transmit synchronization information 308 during the first coordinated silence period. All other base stations 102 must be silent during the first coordinated silence period. During the first coordinated silence period, the silent base stations 102 may monitor the synchronization information 308 transmitted by non-silent base stations 102.

The unsynchronized base station 124 may transmit 716 synchronization information 308 during the second coordinated silence period. The second coordinated silence period may refer to slots designated for base stations 102 having a stratum less than or equal to the current stratum 122 to transmit synchronization signals. For example, if the current stratum 122 of the unsynchronized base station 124 is three (stratum-3) and the second coordinated silence period is designated for the transmission of synchronization information 308 by base stations 102 with a stratum of three (stratum-3) or lower, the unsynchronized base station 124 may transmit 716 synchronization information 308 during the second coordinated silence period. Only base stations with a stratum less than or equal to the current stratum 122 (i.e., stratum-3, stratum-2, stratum-1 and stratum-0) may transmit 716 synchronization information 308 during the second coordinated silence period. All other base stations must be silent during the second coordinated silence period.

Figure 8:
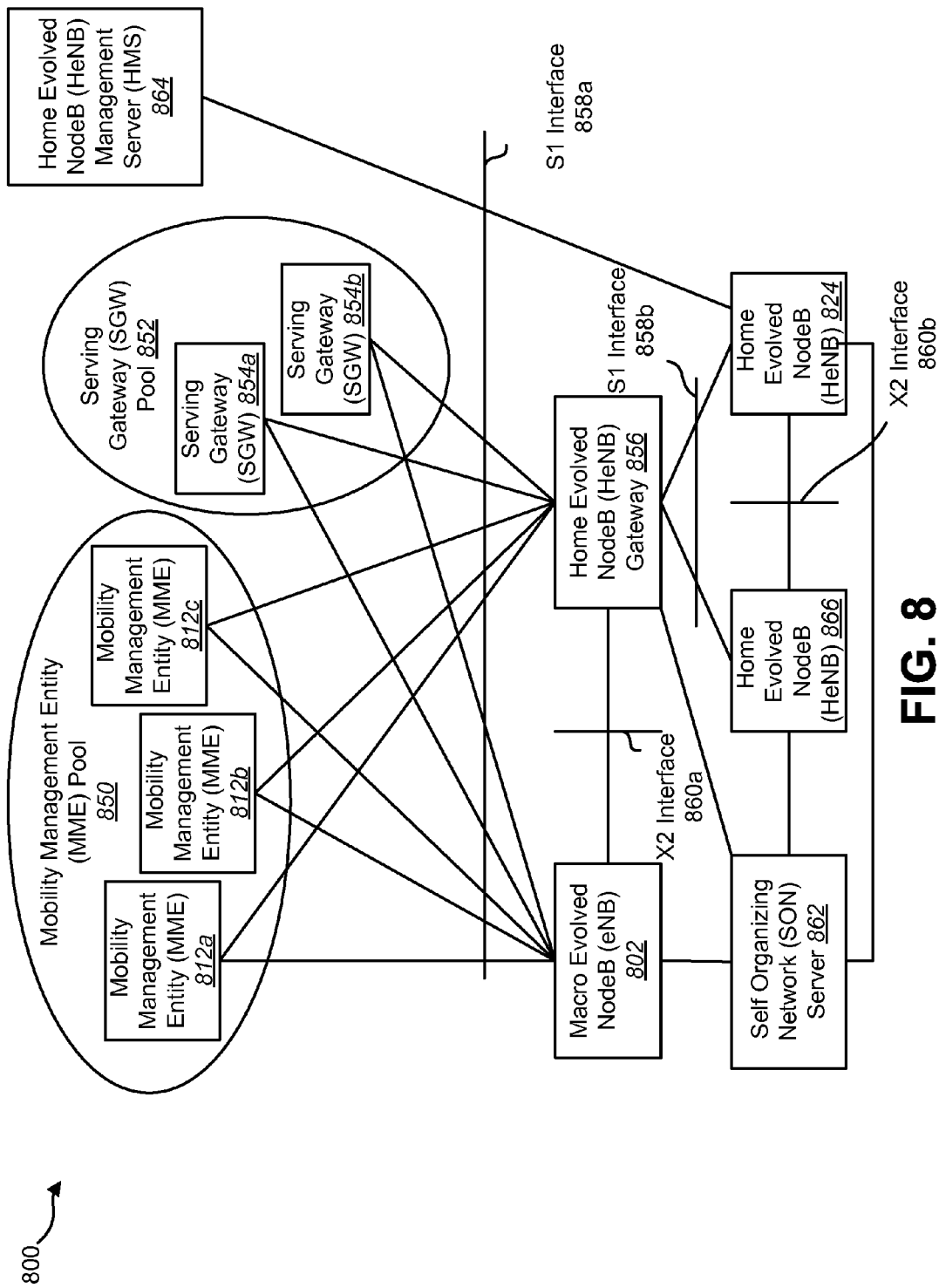
FIG. 8 is a wireless communication system with a macro-evolved NodeB (eNB) and multiple home evolved NodeBs (HeNBs)

FIG. 8 is a wireless communication system 800 with a macro-evolved NodeB (eNB) 802 and multiple home evolved NodeBs (HeNBs) 824, 866. The wireless communication system 800 may include a home evolved NodeB (HeNB) gateway 856 for scalability reasons. The macro-evolved NodeB (eNB) 802 and the home evolved NodeB (HeNB) gateway 856 may each communicate with a pool 850 of mobility management entities (MME) 812a-c and a pool 852 of serving gateways (SGW) 854a-b. The home evolved NodeB (HeNB) gateway 856 may appear as a C-plane and a U-plane relay for dedicated S1 interface 858a-b connections. An S1 interface 858 connection may be a logical interface specified as the boundary between an evolved packet core (EPC) and an Evolved Universal Terrestrial Access Network (EUTRAN). The home evolved NodeB (HeNB) gateway 856 may act as a macro-evolved NodeB (eNB) 802 from an EPC point of view. The C-plane interface may be S1-MME and the U-plane interface may be S1-U.

The home evolved NodeB (HeNB) gateway 856 may act towards a home evolved NodeB (HeNB) 824, 866 as a single EPC node. The home evolved NodeB (HeNB) gateway 856 may ensure S1-flex connectivity for a home evolved NodeB (HeNB) 824, 866. The home evolved NodeB (HeNB) gateway 856 may provide a 1:n relay functionality such that a single home evolved NodeB (HeNB) 824, 866 may communicate with n mobility management entities (MMEs) 812. The home evolved NodeB (HeNB) gateway 856 registers towards the pool 850 of mobility management entities (MMEs) 812 when put into operation via the S1 interface 858 setup procedure. The home evolved NodeB (HeNB) gateway 856 may support setup of S1 interfaces 858 with the home evolved NodeBs (HeNBs) 824, 866.

The wireless communication system 800 may also include a self organizing network (SON) server 862. The self organizing network (SON) server 862 may provide automated optimization of a 3GPP LTE network. The self organizing network (SON) server 862 may be a key driver for improving operation and maintenance (O&M) to the wireless communication system 800. An X2 interface 860a link may exist between the macro-evolved NodeB (eNB) 802 and the home evolved NodeB (HeNB) gateway 856. X2 interface 860b links may also exist between each of the home evolved NodeBs (HeNBs) 824, 866 connected to a common home evolved NodeB (HeNB) gateway 856. The X2 interface 860 links may be set up based on input from the self organizing network (SON) server 862.

An X2 interface 860b may convey stratum information between two home evolved NodeBs (HeNBs) 824, 866. An X2 interface 860a may also convey stratum information from a macro evolved NodeB (eNB) 802 to a home evolved NodeB (HeNB) gateway 856. An S1 interface 858a may convey stratum information between a macro evolved NodeB (eNB) 802 and a mobility management entity (MME) 812. An S1 interface 858a may also convey the stratum information from the mobility management entity (MME) 812 to the home evolved NodeB (HeNB) gateway 856. The home evolved NodeB (HeNB) gateway 856 may then convey the stratum information to a home evolved NodeB (HeNB) 824 via an S1 interface 858b.

The stratum level may be stored at a third entity such as on a mobility management entity (MME) 812 or a home evolved NodeB (HeNB) management server (HMS) 864. The home evolved NodeB (HeNB) management server (HMS) 864 may transfer the stratum to the home evolved NodeB (HeNB) 824 over the S1 interface 858a.

Figure 9:
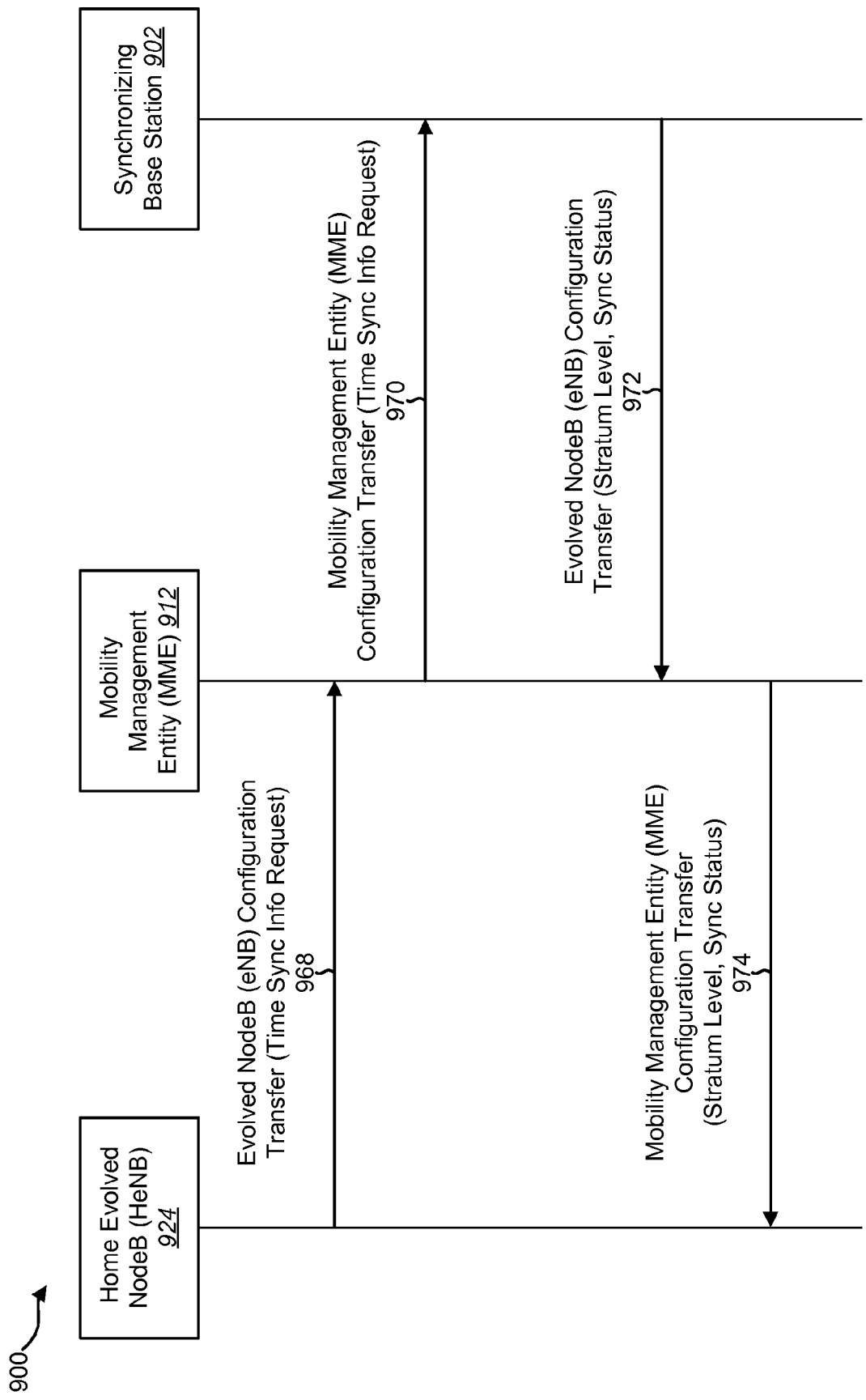
FIG. 9 is a block diagram illustrating data flows between a home evolved NodeB (HeNB), a mobility management entity (MME) and a synchronizing base station for use in the present systems and methods.

FIG. 9 is a block diagram illustrating data flows 900 between a home evolved NodeB (HeNB) 924, a mobility management entity (MME) 912 and a synchronizing base station 902 for use in the present systems and methods. The home evolved NodeB (HeNB) 924 of FIG. 9 may be one configuration of the unsynchronized base station 124 of FIG. 1. The mobility management entity (MME) 912 of FIG. 9 may be one configuration of the mobility management entity (MME) 112 of FIG. 1. The synchronizing base station 902 of FIG. 9 may be one configuration of the first base station 102a of FIG. 1.

The home evolved NodeB (HeNB) 924 may send an evolved NodeB (eNB) configuration transfer 968 to the mobility management entity (MME) 912. The evolved NodeB (eNB) configuration transfer 968 may be a request for time synchronization information. The mobility management entity (MME) 912 may receive the evolved NodeB (eNB) configuration transfer 968 and subsequently send a mobility management entity (MME) configuration transfer 970 to the synchronizing base station 902. The mobility management entity (MME) configuration transfer 970 may include the request for time synchronization information.

Upon receiving the mobility management entity (MME) configuration transfer 970, the synchronizing base station 902 may send an evolved NodeB (eNB) configuration transfer 972 to the mobility management entity (MME) 912. The evolved NodeB (eNB) configuration transfer 972 may include the stratum 338 level and synchronization status 326 of the synchronizing base station 902. The mobility management entity (MME) 912 may then send a mobility management entity (MME) configuration transfer 974 to the home evolved NodeB (HeNB) 924. The mobility management entity (MME) configuration transfer 974 may also include the stratum 338 level and synchronization status information 326 of the synchronizing base station 902.

Figure 10:
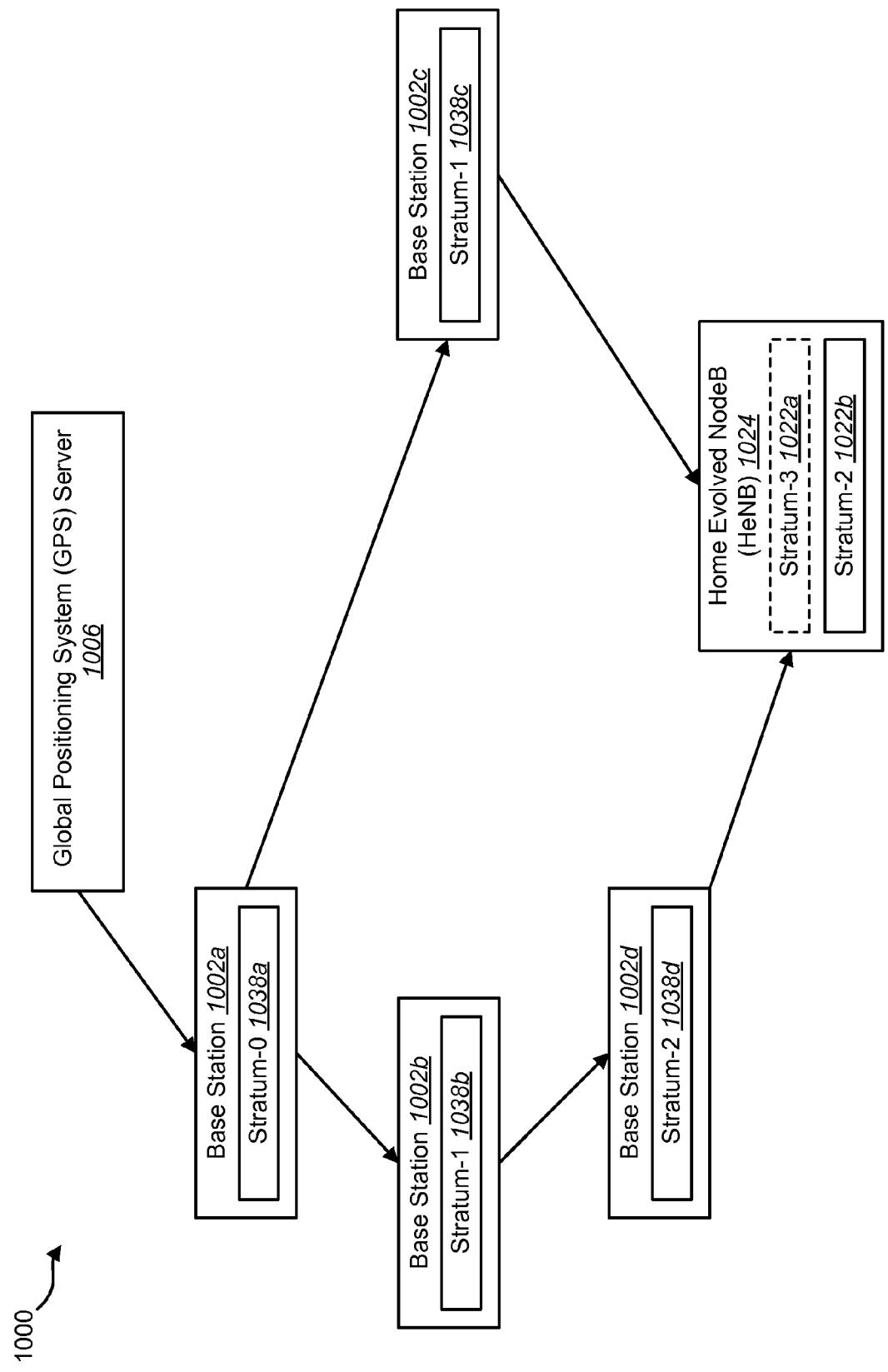
FIG. 10 shows a wireless communication system with multiple wireless devices and their respective stratum.

FIG. 10 shows a wireless communication system 1000 with multiple wireless devices and their respective stratum 1022, 1038. As discussed above, stratum refers to the number intermediate synchronous nodes between a base station 1002 and a global positioning system (GPS) server 1006. A base station 1002a that is one hop away from the global positioning system (GPS) server 1006 may have a stratum of Stratum-0 1038*a*. Base stations 1002*b-c* that are two hops away from the global positioning system (GPS) server 1006 may have a stratum of Stratum-1 1038*b-c*. A base station 1002*d* that is three hops away from the global positioning system (GPS) server 1006 may have a stratum of Stratum-2 1038*d*.

Each base station 1002 may derive stratum based on the stratum of the immediately preceding base station 1002 in the line to the global positioning system (GPS) server 1006. For example, a base station 1002*d* with a stratum of Stratum-2 1038*d* may derive the stratum from the base station 1002*b* with a Stratum-1 1038*b*. A home evolved NodeB (HeNB) 1024 that is unsynchronized may derive the stratum from each base station 1002 that the home evolved NodeB (HeNB) 1024 receives synchronization information 308 from. For example, the home evolved NodeB (HeNB) 1024 may derive a Stratum-3 1022*a* based on the Stratum-2 1038*d* of the base station 1002*d*. The home evolved NodeB (HeNB) 1024 may also derive a Stratum-2 1022*b* based on the Stratum-1 1038*c* of the base station 1002*c*. The derived stratum 1022 may be one greater than the stratum 1038 of the preceding base station 1002. The home evolved NodeB (HeNB) 1024 may select the base station 1002 with the corresponding lowest stratum 1038 as the synchronizing base station 302. Thus, the home evolved NodeB (HeNB) 1024 may select base station 1002*c* as the synchronizing base station 302 and Stratum-2 1022*b* as the current stratum 122.

Figure 11:
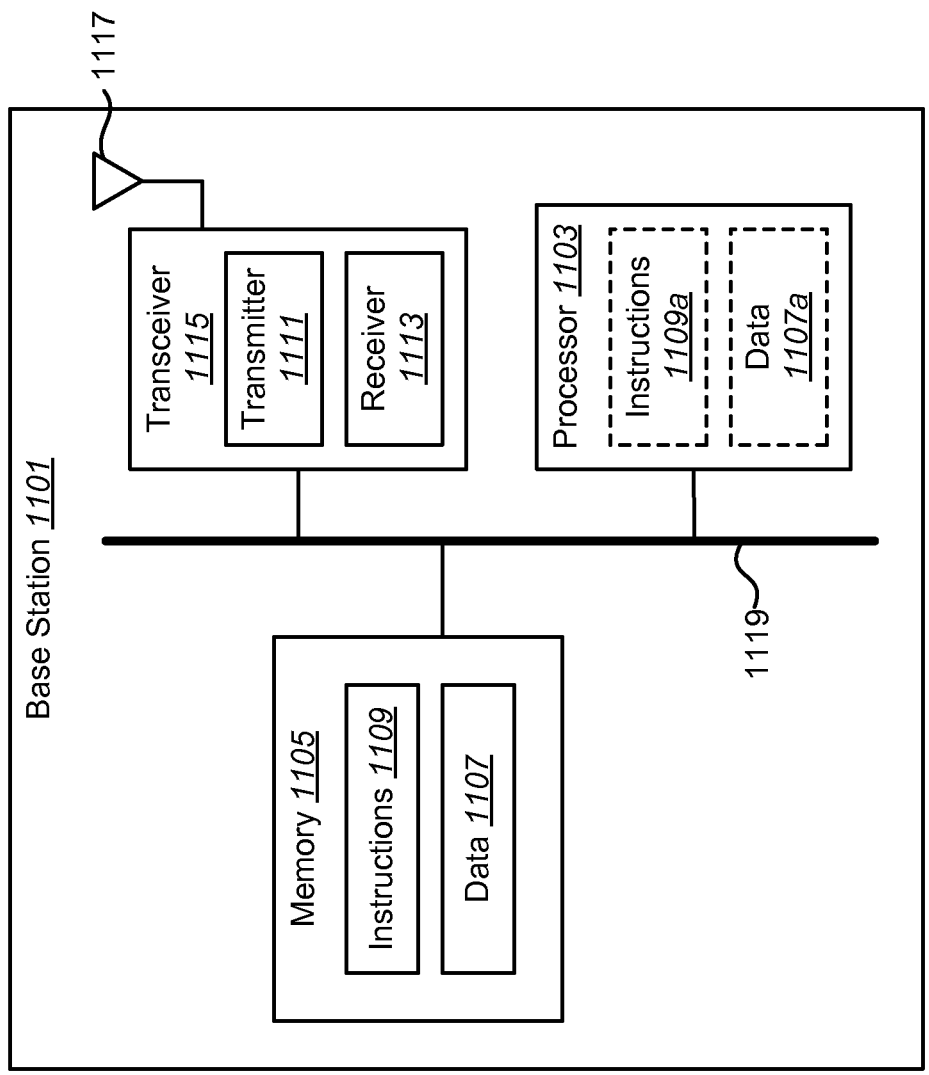
FIG. 11 is a block diagram illustrating the various components of a base station for use in the present systems and methods.

FIG. 11 illustrates certain components that may be included within a base station 1101. A base station may also be referred to as, and may include some or all of the functionality of, an access point, a broadcast transmitter, a NodeB, an evolved NodeB, etc. The base station 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the base station 1101 of FIG. 11, in an alternative configuration, a combination of processors (e.g., an ARM and DSP) could be used.

The base station 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105. When the processor 1103 executes the instructions 1109, various portions of the instructions 1109*a* may be loaded onto the processor 1103, and various pieces of data 1107*a* may be loaded onto the processor 1103.

The base station 1101 may also include a transmitter 1111 and a receiver 1113 to allow transmission and reception of signals to and from the base station 1101. The transmitter 1111 and receiver 1113 may be collectively referred to as a transceiver 1115. An antenna 1117 may be electrically coupled to the transceiver 1115. The base station 1101 may also include (not shown) multiple transmitters, multiple receivers, multiple transceivers and/or additional antennas.

The various components of the base station 1101 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2 and 6-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for self synchronization of a first base station, comprising:
    receiving synchronization information from a second base station; and
    synchronizing with the second base station using the received synchronization information,
    wherein the synchronization information is received via a Mobility Management Entity (MME), and wherein the synchronization information comprises synchronization stratum information and synchronization status information.

2. The method of claim 1, further comprising:
    receiving synchronization information from one or more base stations, wherein the second base station is part of the one or more base stations;
    determining a stratum for each of the one or more base stations, wherein each synchronization information comprises a stratum; and
    selecting the second base station as a synchronizing base station, wherein the second base station has the lowest stratum.

3. The method of claim 2, wherein determining a stratum for each of the one or more base stations comprises determining a number of intermediate synchronous nodes between each of the one or more base stations and a global positioning system (GPS) server.

4. The method of claim 2, further comprising determining a current stratum for the first base station based on the stratum of the second base station.

5. The method of claim 4, further comprising ceasing transmissions during a coordinated silence period, wherein the coordinated silence period is coordinated using the synchronization information, and wherein the coordinated silence period refers to slots designated for base stations having a stratum less than the current stratum to transmit synchronization information.

6. The method of claim 5, wherein the coordinated silence period is observed to improve a signal to interference noise ratio (SINR) for synchronization.

7. The method of claim 4, further comprising transmitting the current stratum during a coordinated silence period, wherein the coordinated silence period refers to slots designed for base stations having a stratum less than or equal to the current stratum to transmit synchronization signals.

8. The method of claim 1, wherein the synchronization information is received from one or more base stations wirelessly.

9. The method of claim 8, wherein the synchronization information is in a system information message.

10. The method of claim 8, wherein the synchronization information is conveyed through a master information block (MIB).

11. The method of claim 8, wherein the synchronization information is conveyed through a system information block (SIB).

12. The method of claim 10, wherein the second base station stratum is conveyed in reserved bits of the MIB.

13. The method of claim 8, wherein the synchronization information is signaled on a physical downlink control channel (PDCCH) used in Long Term Evolution (LTE).

14. The method of claim 8, wherein the synchronization information is signaled on a physical downlink shared channel (PDSCH) used in Long Term Evolution (LTE).

15. The method of claim 1, wherein the synchronization information is received from one or more base stations via a backhaul.

16. The method of claim 15, wherein the synchronization information is signaled over an S1 interface.

17. The method of claim 15, wherein the synchronization information is signaled over an X2 interface.

18. The method of claim 15, wherein the synchronization information is stored in a home evolved NodeB (HeNB) Management Server (HMS).

19. The method of claim 1, wherein synchronizing with the second base station using the received synchronization information comprises adjusting a timing of the first base station to match a timing of the second base station.

20. The method of claim 1, further comprising periodically monitoring the synchronization information of the second base station.

21. The method of claim 1, wherein the first base station is a macro base station.

22. The method of claim 1, wherein the first base station is a home evolved NodeB (HeNB).

23. The method of claim 1, wherein the second base station is a macro base station.

24. The method of claim 1, wherein the second base station is a home evolved NodeB (HeNB).

25. The method of claim 1, wherein the synchronization information is tied to a Primary Synchronization Signal (PSS).

26. The method of claim 1, wherein the synchronization information is tied to a Secondary Synchronization Signal (SSS).

27. A wireless device configured for self synchronization, comprising:
a processor;
memory in electronic communication with the processor;
instructions stored in the memory, the instructions being executable by the processor to:
receive synchronization information from a second base station; and
synchronize with the second base station using the received synchronization information,
wherein the synchronization information is received via a Mobility Management Entity (MME), and wherein the synchronization information comprises synchronization stratum information and synchronization status information.

28. The wireless device of claim 27, wherein the instructions are further executable to:
receive synchronization information from one or more base stations, wherein the second base station is part of the one or more base stations;
determine a stratum for each of the one or more base stations, wherein each synchronization information comprises a stratum; and
select the second base station as a synchronizing base station, wherein the second base station has the lowest stratum.

29. The wireless device of claim 28, wherein determining a stratum for each of the one or more base stations comprises determining a number of intermediate synchronous nodes between each of the one or more base stations and a global positioning system (GPS) server.

30. The wireless device of claim 28, wherein the instructions are further executable to determine a current stratum for the first base station based on the stratum of the second base station.

31. The wireless device of claim 30, wherein the instructions are further executable to cease transmissions during a coordinated silence period, wherein the coordinated silence period is coordinated using the synchronization information, and wherein the coordinated silence period refers to slots designated for base stations having a stratum less than the current stratum to transmit synchronization information.

32. A wireless device configured for self synchronization, comprising:
means for receiving synchronization information from a base station; and
means for synchronizing with the base station using the received synchronization information,
wherein the synchronization information is received via a Mobility Management Entity (MME), and wherein the synchronization information comprises synchronization stratum information and synchronization status information.

33. A computer-program product for self synchronization of a first base station, the computer-program product comprising a non-transitory computer-readable medium having instructions thereon, the instructions comprising:
code for receiving synchronization information from a second base station; and
code for synchronizing with the second base station using the received synchronization information,
wherein the synchronization information is received via a Mobility Management Entity (MME), and wherein the synchronization information comprises synchronization stratum information and synchronization status information.

* * * * *